United States Patent [19]
Johnson

[11] 3,981,710
[45] Sept. 21, 1976

[54] APPARATUS FOR SURFACE TREATING GLASS CONTAINERS

[75] Inventor: John R. Johnson, Toledo, Ohio

[73] Assignee: Owens-Illinois, Inc., Toledo, Ohio

[22] Filed: Apr. 24, 1975

[21] Appl. No.: 571,149

[52] U.S. Cl. .................................. 65/158; 65/181; 221/211; 221/278
[51] Int. Cl.² ............................................. C03B 25/04
[58] Field of Search .............. 65/181, 158; 221/278, 221/211

[56] References Cited
UNITED STATES PATENTS

| | | | |
|---|---|---|---|
| 2,046,302 | 6/1936 | Bowes | 65/31 |
| 2,479,534 | 8/1949 | Bergh | 221/278 X |
| 3,687,651 | 8/1972 | Scholes | 65/158 X |

*Primary Examiner*—Arthur D. Kellogg
*Attorney, Agent, or Firm*—D. T. Innis; E. J. Holler

[57] ABSTRACT

The system described herein constitutes an apparatus and method for internally treating glass containers as they are moving from the forming machine on the single-line conveyor to the entrance to the annealing lehr. A preferably refrigerated enclosure or housing positioned beside the path of travel of the containers is provided with a supply of sulfur pellets, with the pellets being delivered to a gating device, which also constitutes a propulsion device, for feeding or ejecting a pair of pellets from the gating device through an elongated tube whose outlet is positioned above and in alignment with the line of movement of the necks of the containers to be treated. The gating device is activated or triggered by a sensing device mounted to the conveyor in position to view the containers as they are moved by the conveyor. When a bottle is sensed, the ejector mechanism or gating device is actuated by moving a slide with a reciprocating motor to automatically position pellets in position to be propelled through a delivery tube into the interior of the sensed container. In this manner the interior alkaline surface of the container is neutralized by the gas produced when the pellet is " fired" from the heat of the containers.

7 Claims, 6 Drawing Figures

APPARATUS FOR SURFACE TREATING GLASS CONTAINERS

BACKGROUND OF THE INVENTION

Glass containers, such as bottles and jars, frequently are used in the packaging of liquids which may leach the alkali out of the interior surface of the glass structure. In order to avoid this leaching and the resultant appearance of contamination of the liquid to be contained in the bottle, it has been the practice in the past to internally treat the glassware with an acidic gas. Such gases, for example, have been sulfur dioxide or trioxide and it has been the practice to accomplish this internal acidic gas treatment by placing pellets of sulfur in the hot bottles as they are moving from the glass forming machine to the annealing lehr. At this stage of the process of formation of the glass bottles, the containers are sufficiently hot to cause the sulfur to vaporize and thereby create an acidic gas which neutralizes the alkalinity of the interior glass surface. One such prior art patent teaches the addition of sulfur to hot bottles as they are moving from the forming machine to the annealing lehr. This patent is to U. E. Bowes, No. 2,046,302, issued June 30, 1936.

DESCRIPTION OF THE PRIOR ART

Bowes' patent No. 2,046,302 teaches the feeding of sulfur pellets to the interior of hot containers by an apparatus which sorts and delivers the pills one at a time through an elongated dispensing tube whose outlet end is positioned above and in alignment with the path of travel of the newly formed containers. The pill dispenser necessarily must be synchronized, as is shown in Bowes' No. patent, with the movement of the belt on which the newly formed containers are placed, it being assumed that they will be placed on the conveyor or belt in the Bowes' device at regularly spaced intervals. The interconnection between the pill dispensing device and the conveyor drive is such as to assure the delivery of a pellet or pill into the interior of each container, provided the containers are set apart a fixed, known distance on the conveyor.

SUMMARY OF THE INVENTION

In the delivery of acidic gas producing pills or pellets to the interior of hot glass containers, the apparatus of the invention functions to deliver the requisite number of pills to each container regardless of the speed of the conveyance of the containers by providing a pill dispenser in which a magazine of pills is connected to a gating device and the gating device is triggered by the presence of a bottle on the conveyor in a predetermined position, for then activating the dispenser to quickly deliver a pellet or pellets to the interior of the containers.

DETAILED DESCRIPTION OF THE DRAWINGS

Figures 1, 6:
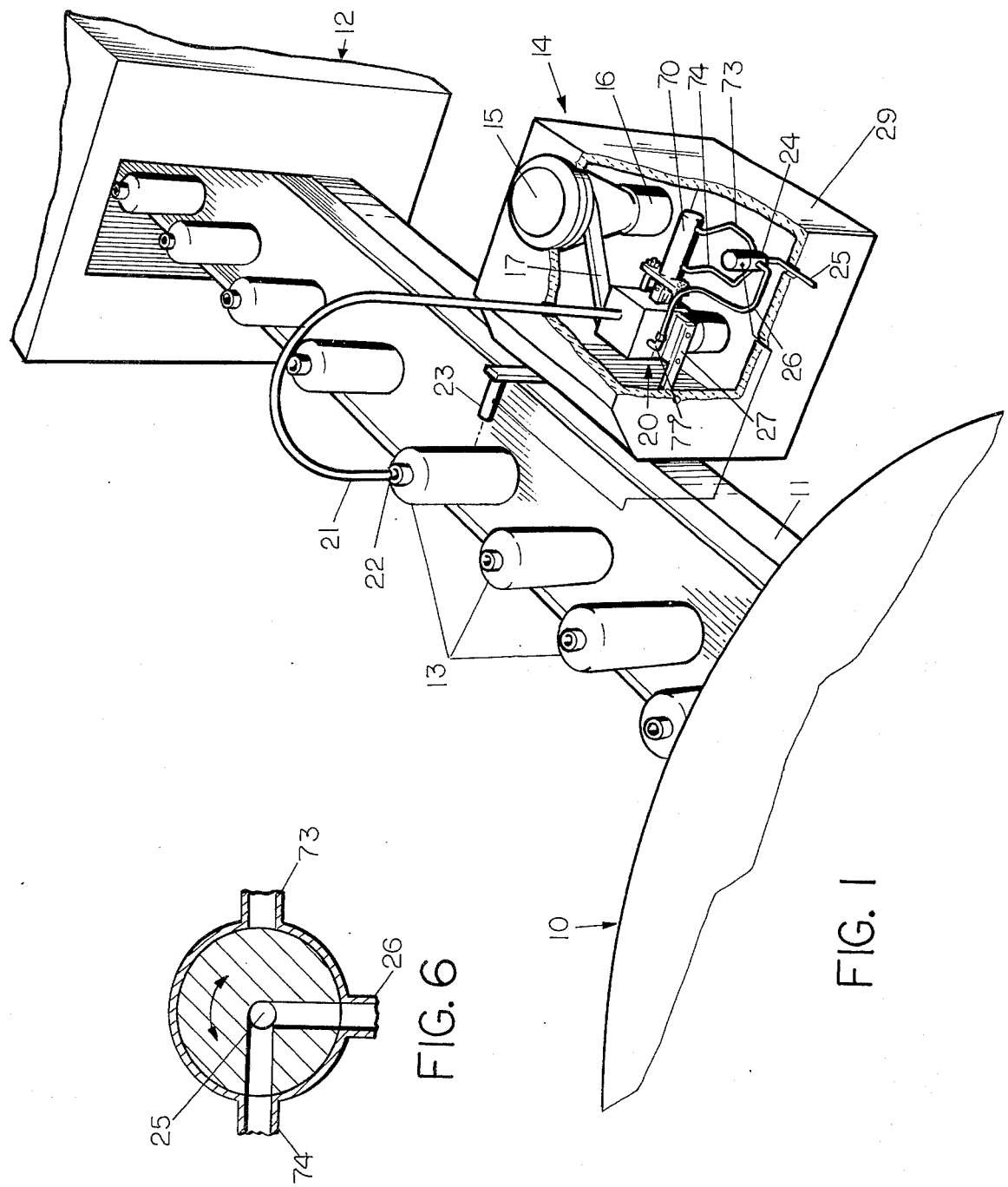
FIG. 1 is a schematic perspective view of the apparatus of the invention showing its relationship to a glass container forming and annealing system.
FIG. 6 is a horizontal cross-section through the solenoid valve of FIG. 1.

With particular reference to FIG. 1, a forming machine, generally designed 10, produces containers 13 that are set out on a conveyor 11. The conveyor 11 carries the bottles from the forming machine to an annealing lehr, generally designated 12, where the containers are controllably cooled to remove all thermal stresses therefrom. During the travel from the forming machine to the annealing lehr, containers are hot from the forming process and receive the internal treatment in the form of a sulfur pellet or its equivalent, delivered to the interior thereof. On delivery of the pellet to the interior of the container, the pellet "fires" turning into a gas which neutralizes the alkalinity of the interior surface of the container. The apparatus for delivering pellets to the interior of the container is generally designated by reference numeral 14.

Figure 3:
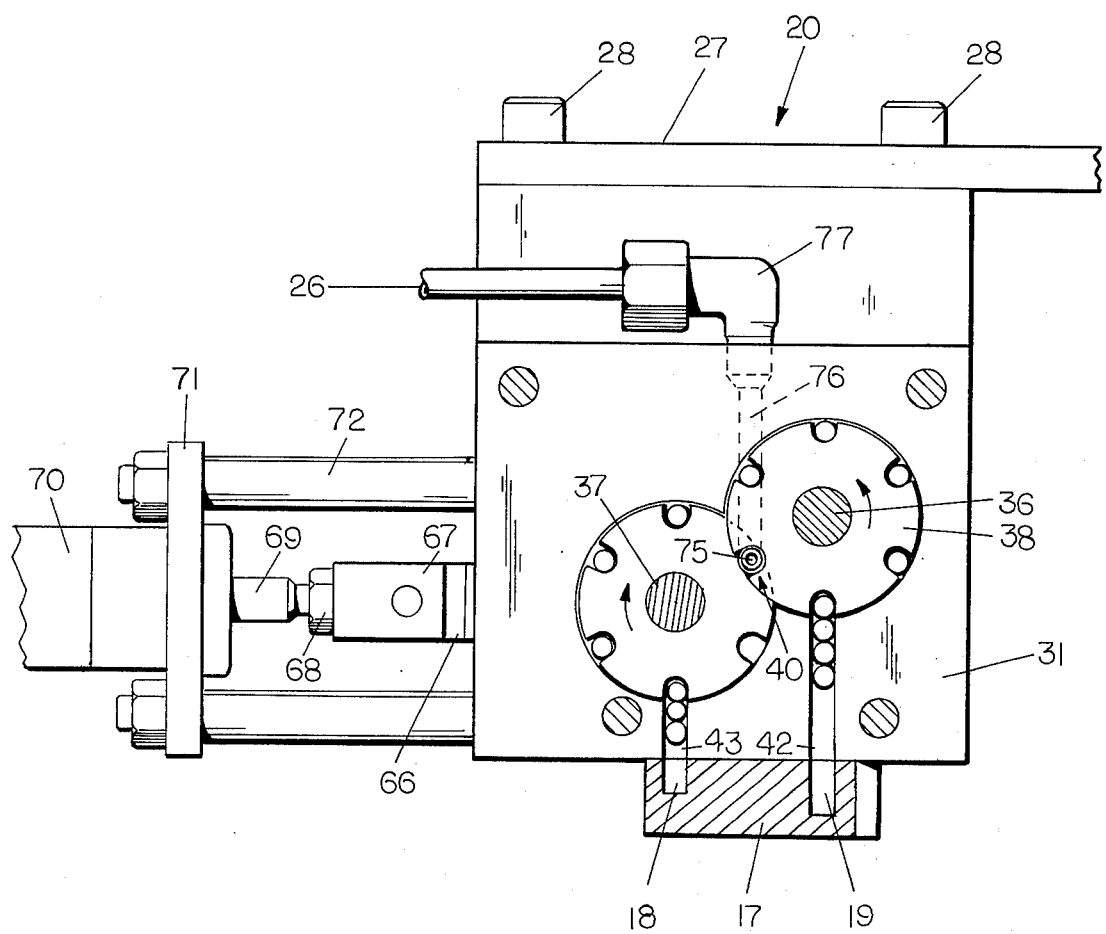
FIG. 3 is a cross-sectional view taken at line 3—3 of FIG. 2.

The general arrangement of the apparatus 14 for delivering pills will be described in conjunction with FIG. 1. A covered hopper 15 of the rotating interior type is rotated by a motor 16. It should be understood that the hopper 15 may be of a similar character to that disclosed in U.S. Pat. No. 2,046,302 previously mentioned, the hopper 15 and the motor 16 in effect constituting a device for feeding pills or pellets to a magazine 17 in single line. The particular magazine 17, as shown in cross-section in FIG. 3, is formed with two slideways 18 and 19. The slideways 18 and 19 communicate with the interior of a pellet ejector or delivery mechanism, generally designated 20. The ejector mechanism 20 includes or constitutes generally a combined gating and propelling device and has connected thereto a dispensing tube 21. The dispensing or delivery tube 21 has its outer end 22 in overlying relationship to the neck or finish portion of the containers 13 moving on the conveyor 11.

Positioned at the side of the conveyor 11 is a bottle presence sensing device 23. This sensing device may take the form of an infra-red pickup triggered by the heat radiating from the hot bottles as it passes in front of the sensor 23. The sensor 23 in turn is connected to a solenoid valve 24 (See FIG. 6) that is of the 90° oscillating and reciprocating type. Receipt of a signal from the sensing unit 23 will trigger the valve 24 to permit air under pressure in line 25 to pass into line 26 which is connected to the ejector mechanism 20 for propelling a pellet or a pair of pellets through the dispensing tube 21 to the interior of the container.

The ejector mechanism 20 is mounted to a bar 27 by a pair of bolts 28. The bar 27 in turn is bolted to the interior of a housing 29. It should be pointed out at this time that the housing 29 is mounted beside the conveyor 11 and serves as a cabinet having fairly thick, heat insulative, walls so that the sulfur pellets within the hopper 15, the magazine 17 and the ejector mechanism 20 may be shielded from excessive heat caused by the presence of hot containers and the generally heated atmosphere surrounding the forming machine and annealing lehr. All of these surrounding mechanisms are radiating heat and can prematurely soften the sulfur pellets and may cause the pellet dispensing system to fail. This is one of the shortcomings with regard to the above-referred-to Bowes' patent. When excessive heat is produced, the pellets in the Bowes' patent may become tacky, sticking to one another and also to the dispensing mechanism and causing a jam-up in the ability to feed single pellets. The interior of the housing 29, of the present invention, may be refrigerated in any well known manner, details of which are not believed necessary for a proper understanding of the invention.

Figure 2:
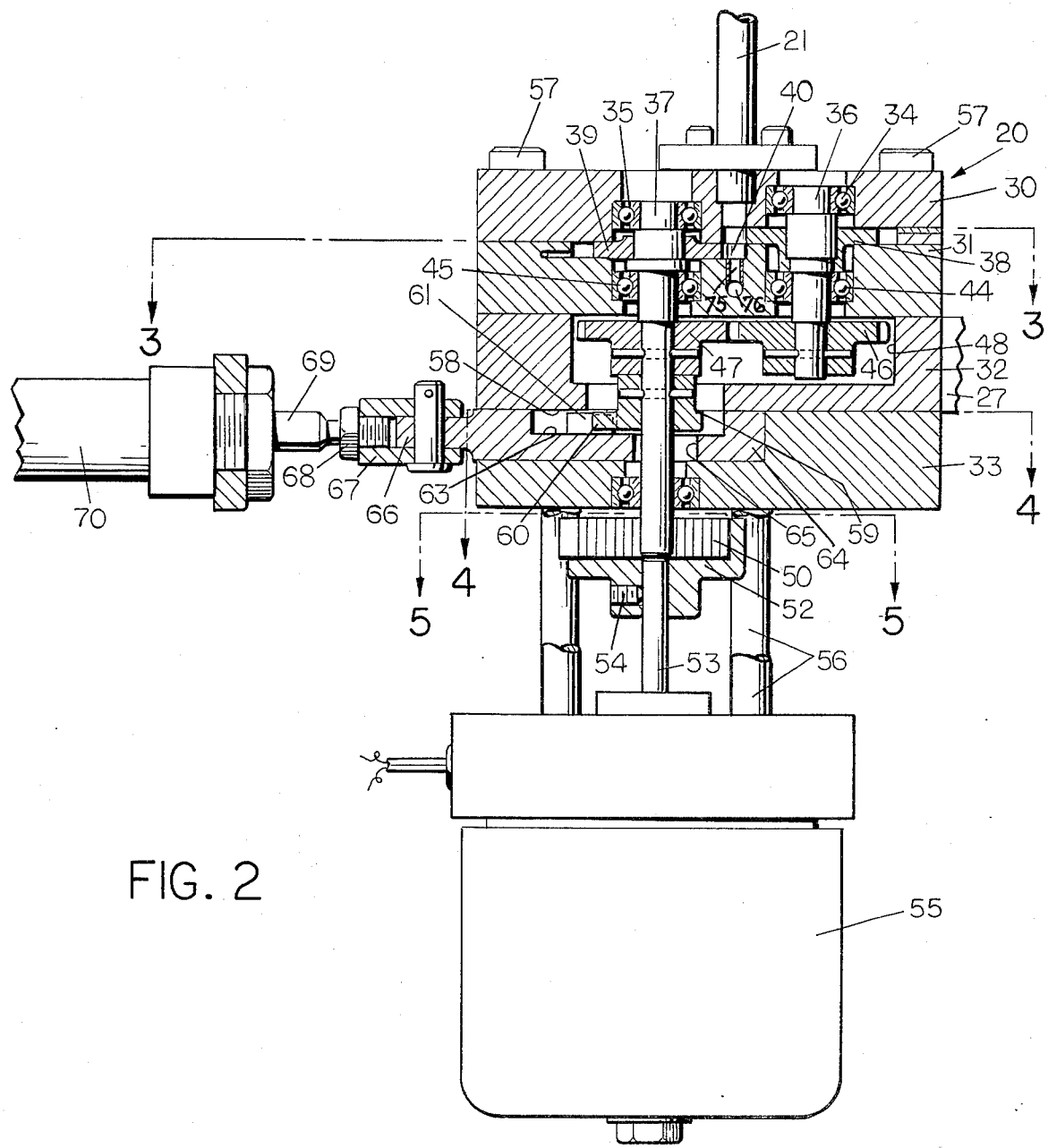
FIG. 2 is a sectional, elevational view of the gating and pellet propulsion device of the invention.

Turning now to FIGS. 2–5, the details of the ejector mechanism will be explained. The mechanism 20 generally takes the form or shape of a square member or body and is composed of four superimposed plate-like members 30-33. The uppermost member 30, as viewed in FIG. 2, has two roller bearings 34 and 35 which support the upper ends of a pair of shafts 36 and 37. The shafts 36 and 37 have relatively large diameter flat discs 38 and 39 connected thereto. As best seen in FIGS. 2 and 3, the disc 38 rotates in a horizontal plane that is immediately above the horizontal plane in which the disc 39 rotates, with the periphery of the two discs overlapping in the zone 40. The periphery of the discs 38 and 39 are provided with cut-outs or pockets 41, the purpose of which is to receive pellets from a pair of slots 42 and 43 that communicate with the magazine slideways 18 and 19. It should be understood that the slots 42 and 43 are always full of pellets and indexing of the discs 38 and 39 results in bringing a pair of pellets, one from a pocket in each disc, to the zone 40. The two discs 38 and 39 are indexed 60° in the directions indicated by the arrows thereon in FIG. 3. The shaft 36 is also supported in roller bearings 44 in the member 31 and the shaft 37 is supported in roller bearings 45, likewise in the member 31. The lower end of the shaft 36 carries a spur gear 46 pinned thereto for rotation therewith and the shaft 37 carries a similar spur gear 47 pinned thereto and being in mesh with the spur gear 46. Both the spur gears 46 and 47 are positioned within a central cutout 48 formed in the member 32. As can best be seen in FIG. 2, the shaft 37 extends downwardly through a third roller bearing supported in the lower member 33. The lower end of the shaft 37 is provided with a diametrically extending slot 49 (See FIG. 5) within which the inner end of a coil spring 50 is fixed. The outer end of the coil spring 50 extends through a radial slot 51 in a bell housing 52. The bell housing 52 is fixed to a motor shaft 53 by a set screw 54. The motor shaft 53 is co-axial with respect to the shaft 37 and its electric motor 55 is mounted to the lower member 33 of the ejector mechanism by means of four posts 56. The plate-like members 30-33 are held together as a unit by four bolts 57.

Figure 4:
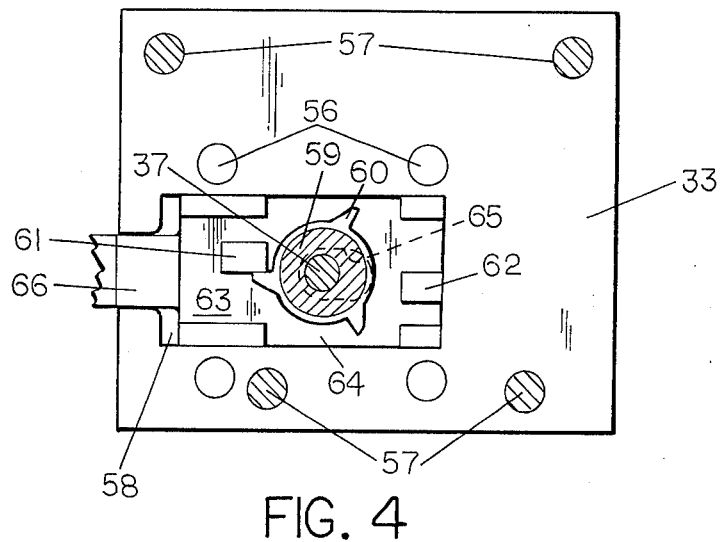
FIG. 4 is a cross-sectional view taken at line 4—4 of FIG. 2.
Figure 5:
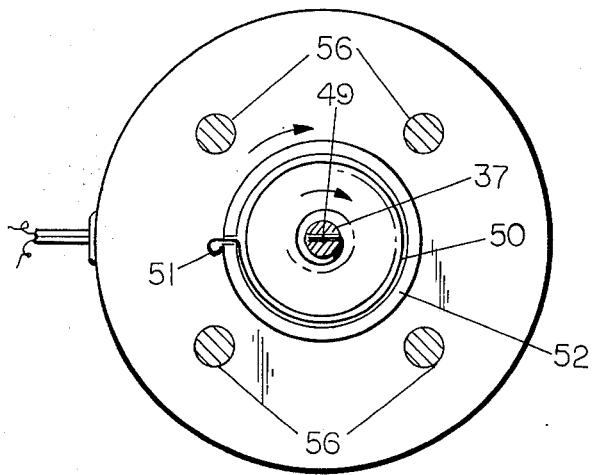
FIG. 5 is a cross-sectional view taken at line 5—5 of FIG. 2.

The member 33, as best seen in FIG. 4, is provided with an elongated, generally rectangular opening 58 in the upper face thereof. The shaft 37 which extends downward through the member 33 in the area of opening 58 carries a three-tined ratchet 59. The ratchet 59 rests entirely within the opening 58 fixed thereto and tines 60 of the ratchet 59 are positioned to alternately engage stops 61 and 62 in the form of generally rectangular blocks extending above a surface 63 of a slide 64. As can best be seen in FIG. 2, the shaft 37 extends through the slide 64 by way of an elongated opening 65. The elongated opening 65 is shown in dotted line in FIG. 4. The slide 64 also has a portion 66 that extends beyond the perimeter of the member 33 and serves as the actuating end of the slide. The portion 66 is of a generally flat, blade-like configuration and it extends into a bifurcated end portion 67 of a coupling member 68. Member 68 is connected to an extending end 69 of the piston rod for a reciprocating air motor 70. The motor 70 is mounted to the side of the ejector mechanism 20, in line with the member 33, by means of a cross-head 71 and posts 72. The motor 70, as best seen in FIG. 1, is connected to the source of air under pressure in line 25, by means of the solenoid valve 24, and pipes or lines 73 and 74. It should be pointed out that the zone 40, which is the area of overlap of the two discs 38 and 39, coincides with a vertically extending port 75 which is in communication with a passage 76 in the member 31. The passage 76 is connected to the air pressure line 26 by a union 77.

The operation of the above-described apparatus should be apparent from the foregoing description of the mechanism; however, it should be made clear that as bottles move along the conveyor 11, their presence is sensed by the sensing device 23 which signals the oscillating solenoid valve 24 which then connects the air pressure outlet 26 and one or the other of the lines 73 or 74 so as to move the slide 64. For example, as shown in FIG. 4, the slide would be moved to the left, at which time the stop 61 will release the tine 60, which presently engages the stop, and moves the stop 62 into position to be engaged by the upper tine 60, considering that the rotation of the shaft 37 is in a clockwise direction, as viewed in FIG. 4. This rotation of the shaft 37 is actually accomplished by the stored energy in the spring 50. The spring 50 is being constantly wound and held in tension by the motor 55. With this arrangement, the motor 55 need only be a relatively slow speed motor, since the spring, on release of the tine of the ratchet, will cause the shaft 37 to index almost instantaneously. The two pills carried by the discs 38 and 39 will be immediately positioned above the port 75 and, as previously explained, air under pressure will be delivered through the line 26 into the passage 76 and effectively propel the two pellets vertically upward through the dispensing tube 21 and deposit the two pellets in the interior of the sensed container. As previously explained, the deposition of the two sulfur pellets in the hot container will result in vaporization or firing of the sulfur to form an acidic gas. This cycle repeats itself for each container sensed, it being understood that the slide 64 is reciprocated in response to the sensing of a container. The magazine 17 has its slideways 18 and 19 constantly filled with pellets delivered from the pellet hopper 15. Furthermore, the entire mechanism is enclosed within an insulated housing 29 so that, with the present apparatus, there is no possibility of the pellets becoming slightly molten and cause sticking of the feed mechanism. The method of feeding pellets to the interior of a container in response to the actual sensing of containers is such as to provide a system requiring little attention and functionally superior to that of the prior art.

I claim:

1. Apparatus for delivering sulfur pills to the interior of glass containers moving on a conveyor, comprising in combination:

a pill feeder mounted alongside said conveyor;

a magazine extending downwardly from said pill feeder for receiving and storing pills from said feeder;

a pair of pocketed wheels mounted for rotation in opposite directions with the peripheral areas thereof in overlapping relationship with a pocket in each wheel in vertical alignment at the area of overlap, said pair of pocketed wheels forming a gating device positioned below said magazine;

means connecting said magazine to said gating device to supply pills to said pockets in said wheels;

a dispensing tube connected to said gating device and extending from said gating device to a position overlying said conveyor;

means connected to said gating device for operating said gating device to bring a predetermined number of pills into registry with the inlet of said dispensing tube; and a source of fluid under pressure connected to said gating means at the inlet to said tube for propelling pills through said tube.

2. The apparatus of claim 1 further including bottle presence sensing means mounted at the side of said conveyor, and means connected to said sensing means for actuating said gating device in response thereto.

3. The apparatus of claim 1 wherein said magazine comprises:
a pair of downwardly extending guides maintained filled with pills and the lower ends of said guides are in communication with a pair of passageways in a casting, and said pocketed wheels are mounted for rotation within said casting; and further including
means connected to said wheels for indexing said wheels in unison to present a pair of pills to the zone of overlap at the same time and from which zone the pills are propelled through the dispensing tube.

4. The apparatus of claim 2 wherein said gating device comprises a pair of pocketed wheels, mounted for rotation in opposite direction with the peripheral areas thereof in overlapping relationship with a pocket in each wheel in vertical alignment at the area of overlap, wherein said magazine is connected to supply pills to said pockets in said wheels.

5. The apparatus of claim 1 wherein said magazine comprises:
a pair of downwardly extending guides maintained filled with pills and the lower ends of said guides are in communication with a pair of passageways in a casting, and said pocketed wheels are mounted for rotation with said casting; and
means connected to said wheels for indexing said wheels in unison to present a pair of pills to the zone of overlap at the same time and from which zone the pills are propelled through the dispensing tube.

6. In combination with a glass forming machine, an annealing lehr and a conveyor for transferring newly formed containers from the forming machine to the lehr, a dispensing apparatus for feeding pills of sulfur to the interior of said containers while transported by said conveyor, said feeding apparatus comprising:
a pill magazine;
means connected to said magazine for maintaining said magazine filled with a supply of pills, said magazine extending downward;
a pair of pocketed wheels mounted for rotation in opposite directions with the peripheral areas thereof in overlapping relationship with a pocket in each wheel in vertical alignment at the area of overlap, said pair of pocketed wheels forming a gating device positioned below said magazine;
means connecting said magazine to said gating device to supply pills to said pockets in said wheels;
a housing surrounding said gating device and magazine;
a delivery tube extending through said housing from said gating device, said delivery tube extending from the gate to a position where its one outer end is in overlying relationship to the path of travel of containers positioned on said conveyor;
container presence sensing means positioned adjacent said conveyor in substantially vertical alignment with the outer end of said delivery tube;
propulsive means in said gating device and connected to the other end of said delivery tube; and
means in said gating device responsive to said sensor for selectively delivering a pill from said magazine to the receiving end of said delivery tube, whereby a pill is delivered to the interior of a container when the bottle presence sensor indicates the presence of a bottle.

7. The apparatus of claim 1 wherein said magazine comprises:
a pair of downwardly extending guides maintained filled with pills, the lower ends of said guides being in communication with a pair of passageways extending to the periphery of said wheels; and
means connected to said wheels for indexing said wheels in unison to present a pair of pills to the zone of overlap at the same time.

* * * * *